Feb. 12, 1957    E. S. PRICHARD    2,781,102
TILTING HOOD AND CAB FOR MOTOR VEHICLES
Filed May 7, 1953    3 Sheets-Sheet 3
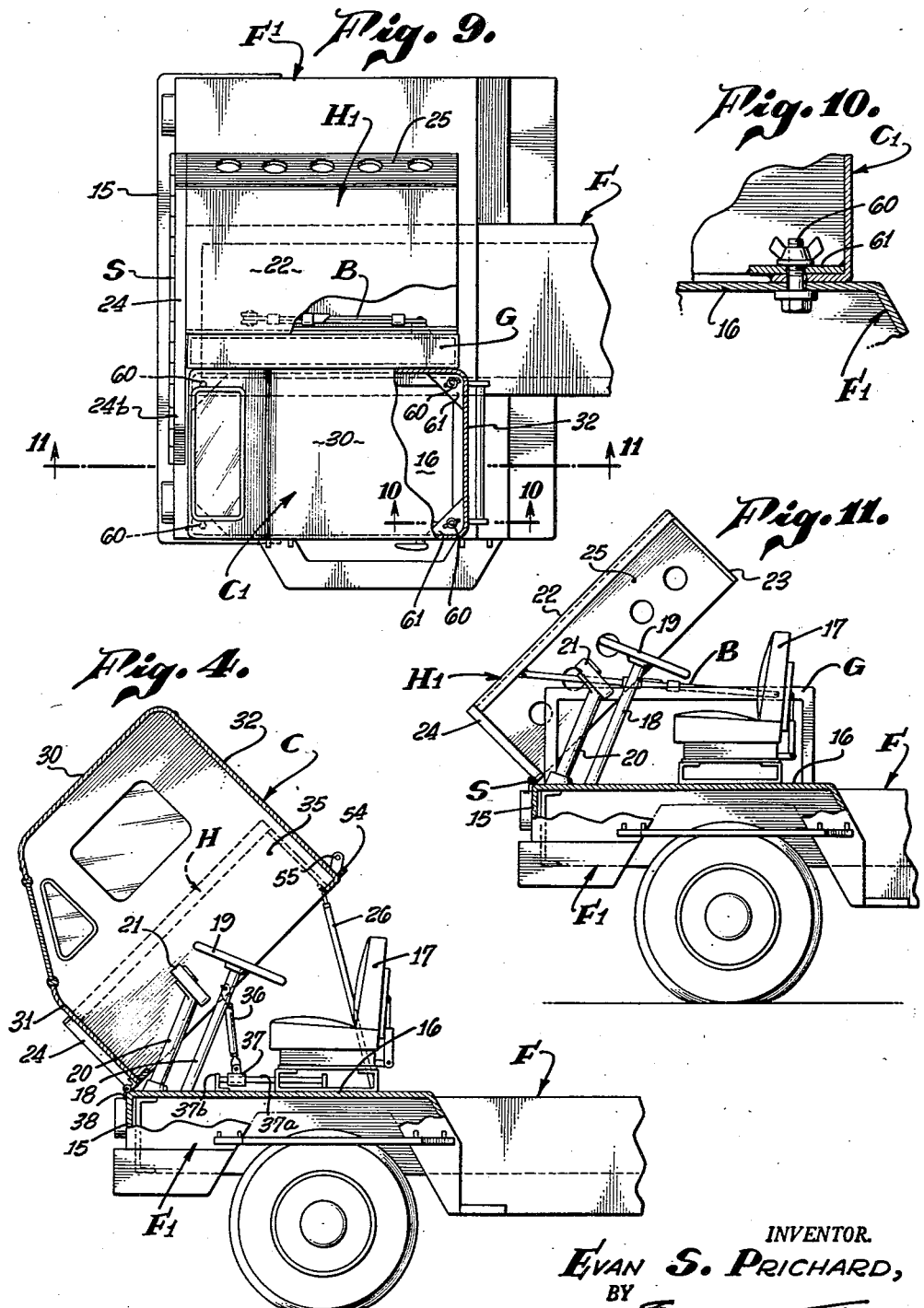
INVENTOR.
EVAN S. PRICHARD,
BY
ATTORNEY.

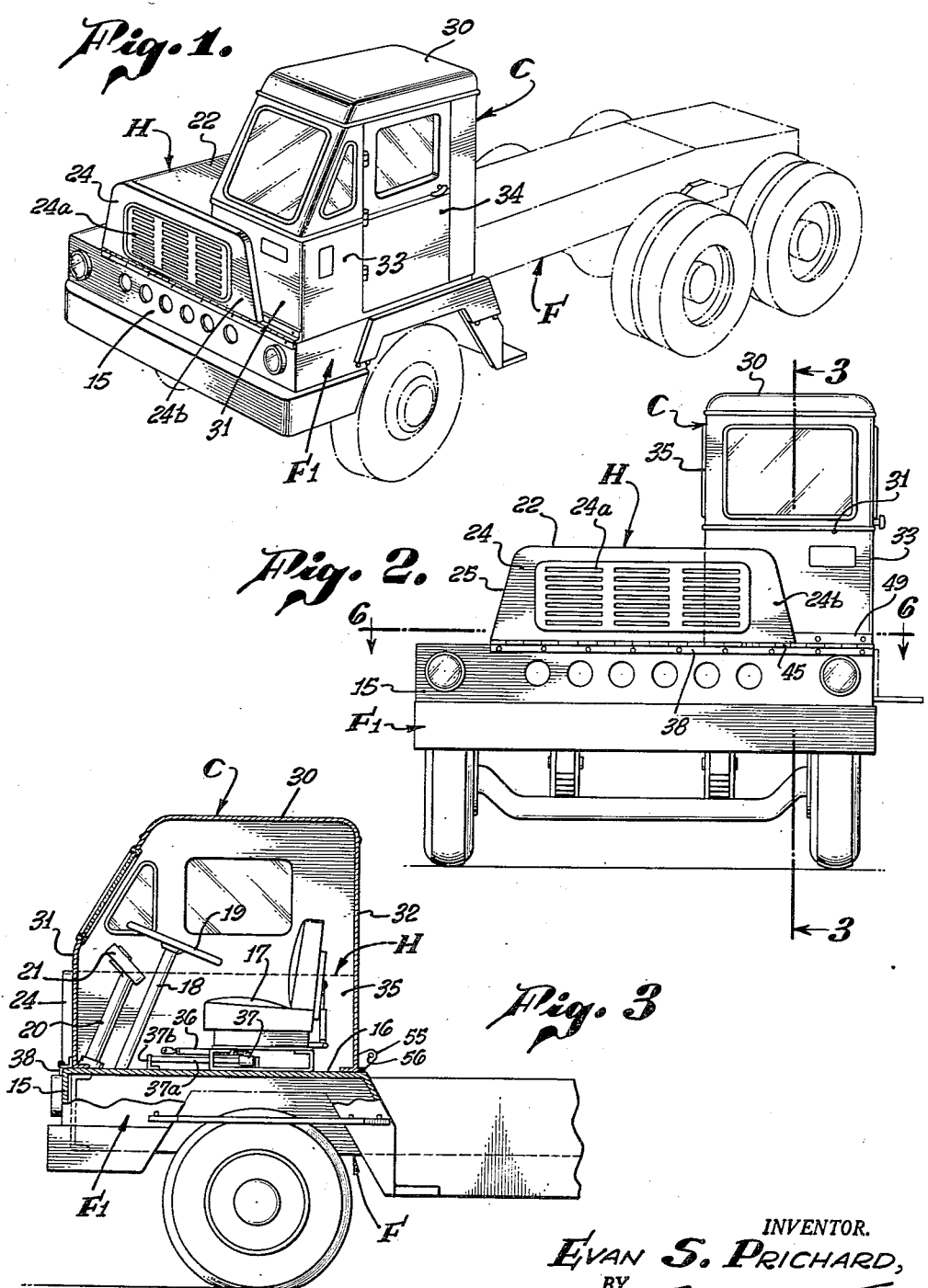

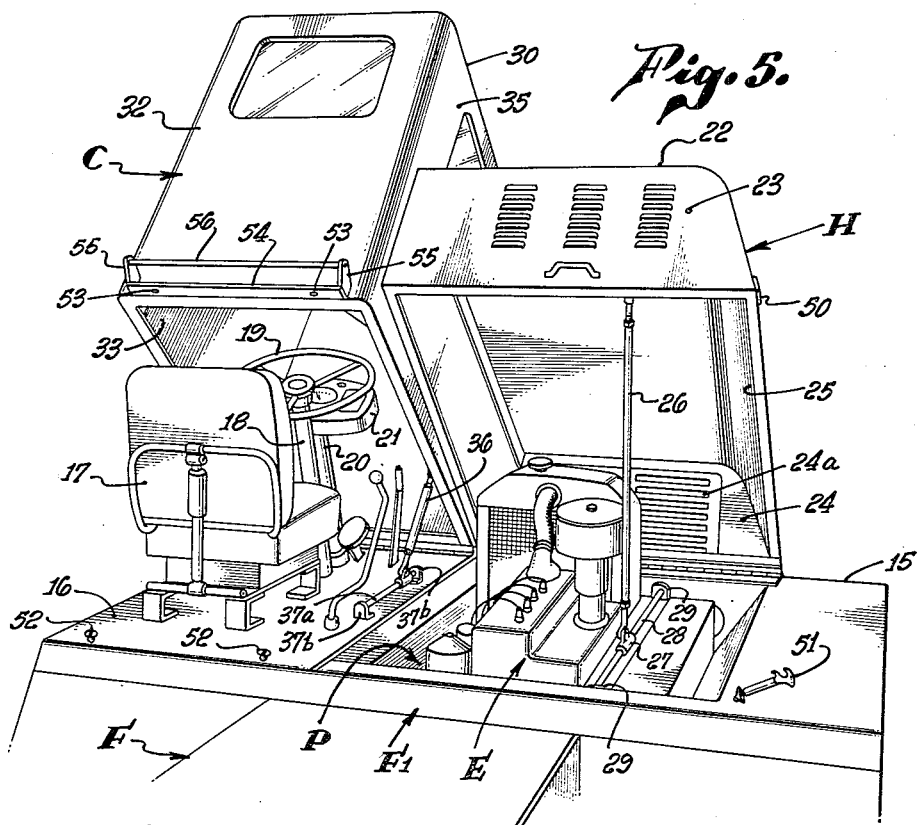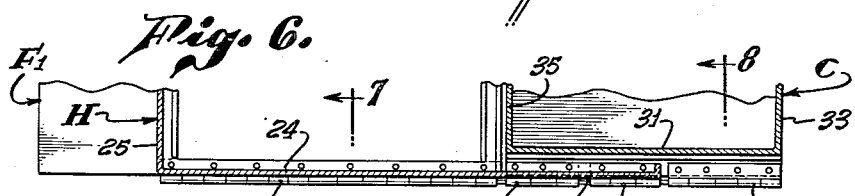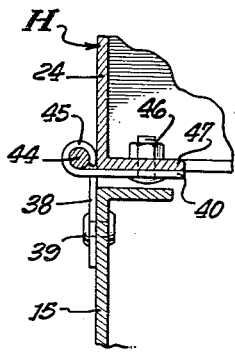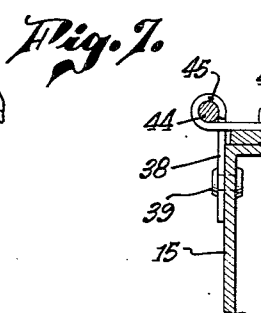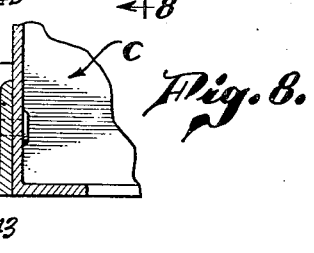

United States Patent Office 2,781,102
Patented Feb. 12, 1957

2,781,102
TILTING HOOD AND CAB FOR MOTOR VEHICLES

Evan S. Prichard, La Canada, Calif., assignor to Cook Bros. Equipment Co., Los Angeles, Calif., a corporation of California Application May 7, 1953, Serial No. 353,517

7 Claims. (Cl. 180—89)

My invention relates to motor trucks, and particularly, although not necessarily, to motor trucks designed for carrying cranes and the like, in which the engine with its hood and the driver's cab are located one beside the other at the forward end of the truck, with that side of the cab facing the engine coacting with the hood to completely house the engine. Since the cab is built as a permanent part of the truck frame, with the instrument panel, driver's seat, and other appurtenances mounted directly on the cab, the cab cannot be, without great difficulty, removed from the truck frame or moved to any position thereon which would expose that side of the engine facing the cab. Although the hood when raised permits access to certain parts of the engine for adjustment and repair, should a major overhaul of the engine be necessary, the cab in permanently blocking access to one side of the engine, renders a major overhaul extremely difficult, hence time consuming and expensive.

It is a purpose of my invention to provide in a motor truck of this character a cab which is so mounted on the truck frame as to be readily movable to a position in which it no longer blocks access to the adjacent side of the engine, so that when the hood is raised, all parts of the engine are accessible for a major overhaul. To allow such movement of the cab the instrument panel, the driver's seat and other appurtenances are mounted independently of the cab and in such relation thereto as not to obstruct movement of the cab to engine exposing position.

In one embodiment of my invention the cab is merely bolted to the truck frame so that by removing the bolts the entire cab can be completely removed from the frame. In another embodiment the cab is hingedly mounted on the truck frame so that it can be swung to an elevated position exposing the adjacent side of the engine. In association with this hingedly mounted cab the engine hood is also hingedly mounted so that it can be raised and lowered independently of the cab. Thus according as it is desired to gain access to a part of or the entire engine, either or both the cab and hood can be moved to elevated position.

I will describe a motor truck of the crane-carrying type, and two means, each embodying my invention, for mounting a driver's cab on the truck for movement to expose the adjacent side of the truck engine, and in association with an engine hood.

In the accompanying drawings:

Fig. 1 is a view showing in perspective a motor truck of the crane-carrying type having applied thereto a driver's cab and an engine hood mounted in accordance with one form of my invention.

Fig. 2 is a front elevational view of the truck shown in Fig. 1.

Fig. 3 is a vertical sectional view taken on the line 3—3 of Fig. 2.

Fig. 4 is a view similar to Fig. 3 showing the hood and cab in elevated position.

Fig. 5 is an enlarged perspective view looking from the rear of the cab and hood and showing the two in elevated position.

Fig. 6 is a horizontal sectional view taken on the line 6—6 of Fig. 2.

Fig. 7 is an enlarged sectional view taken on the line 7—7 of Fig. 6.

Fig. 8 is an enlarged sectional view taken on the line 8—8 of Fig. 6.

Fig. 9 is a fragmentary top plan view of the truck showing another means of mounting the cab on the truck frame, and which means allows complete removal of the cab from the truck.

Fig. 10 is an enlarged vertical sectional view taken on the line 10—10 of Fig. 9.

Fig. 11 is a sectional view taken on the line 11—11 of Fig. 9, with the hood in elevated position and the cab removed.

Referring more particularly to the drawings and to Figs. 1 to 6, a motor truck of the crane-carrying type is shown having a wheel supported frame F at the forward end of which is a cross frame F1 constructed to provide a pit P for an engine E, and a front fender 15 which extends completely across the front end of the truck. Projecting rearwardly from that part of the fender 15 at one side of the pit P, is a platform 16 which forms a floor for a driver's cab C.

Supported for adjustment fore and aft on the platform 16 at the rear portion thereof is a seat 17 for the driver of the truck, and extending upwardly through the platform in advance of the seat is a steering column 18 with its steering wheel 19. Ahead of the steering column is a free standing column 20 on the upper end of which is a panel 21 for the fuel gage, speedometer and other indicating instruments. It will be understood that the wiring cables and other connections for operation of these instruments are contained in the column 20. Also projecting upwardly from the platform 16 are brake and clutch pedals, the gear shifting lever, etc., all within convenient reach of the driver occupying the seat 17, as illustrated.

A hood H is provided for the engine E formed with a top wall 22, a rear and front walls 23 and 24, and a side wall 25 at the outer side of the hood, there being no inner side wall. The front wall 24 is provided with a radiator grille 24a, and this wall is of such length as to form at one end an extension 24b which overlaps the front of the cab C, as shown in Figs. 1 and 2, giving a symmetrical appearance to the front of the truck as a whole.

The hood H is hingedly mounted at its front end to swing upwardly to an open position as illustrated in Fig. 5, in which it can be held by a rod 26 connected at one end to the rear wall 23, and to a sleeve 27 at the other end, the sleeve being slidable on a horizontal rod 28 fixed in a pair of brackets 29.

The cab C is made up of a top wall 30, a front wall 31, a rear wall 32, an outer side wall 33 provided with a door 34, and an inner side wall 35 of such dimensions as to span the open side of the hood H when in its normal position. As is the hood H, the cab C is hingedly mounted at its front end to swing upwardly to an elevated or open position as shown in Fig. 5, and in which it is held by a rod 36 connected at its upper end to the inner side wall 35, and at its lower end to a sleeve 37 slidable on a horizontal rod 37a supported in brackets 37b secured to the platform 16.

For hingedly mounting the hood and cab as described, a butt hinge structure is provided having parts common to both the cab and hood, and so that they are pivoted to swing about a common axis at the front end of the truck. This hinge structure is best shown in Figs. 6, 7, and 8 as comprising a leaf 38 riveted at intervals along its length as indicated at 39, to the upper edge of the fender 15, two leaves 40 and 41 for the hood H and the extension 24b, and two leaves 42 and 43 for the cab C. A rod 44 extends through the sleeves 45 of all of the leaves to pivotally connect the leaf 38 to the other leaves, and the sleeves of the leaf 38 are arranged alternately with respect to the sleeves of the other leaves so as to secure the hood and cab leaves against shifting lengthwise on the rod.

As shown in Fig. 7 the leaves 40 and 41 are secured by bolts 46 to a flange 47 on the lower edge of the front wall 24 of the hood and its extension 24b, while as shown in Fig. 8 the leaves 42 and 43 are secured by bolts 48 to an angle bar 49 riveted on the front cab wall 31. As shown in Fig. 6, the leaves 42 and 43 for the cab are spaced from each other, and the leaf 41 is interposed between the two. The two leaves 42 and 43 although spaced from each other provide an adequate hinge mounting for the cab, while the leaves 40 and 41 which are similarly spaced, likewise provide an adequate hinge mounting for the hood and the extension 24b.

The hood H is held in closed position by a conventional latch 50 and a keeper 51, and the cab is held in the same position by a pair of screws 52 extending through the rear ends of the platform 16 (see Fig. 5) and into openings 53 in a bracket 54 secured to the lower end of the cab wall 32. In the ears 55 at the ends of the bracket 54 is secured a rod 56 which provides a handle for lifting and lowering the cab to open and closed positions.

In practice, the hood H and the cab coact, when in closed position, to completely house the engine E, the inner side wall 35 of the cab spanning the confronting open side of the hood. Should it be desired to repair, adjust, or remove any parts of the engine accessible when the hood is in open position, the hood can be swung upwardly and forwardly about the hinge rod 44 as a center, and automatically held in open position by the rod 26. Such opening of the hood can be effected without disturbing the cab C because of the hinge structure previously described.

In the event of a major overhaul of the engine in which all sides of the engine should be made readily accessible if time is to be saved in the operation, both the hood and cab are lifted to open position thus completely exposing the engine.

Opening of the cab must follow opening of the hood in order that the extension 24 be moved forwardly out of the path of movement of the cab. Opening of the cab is readily accomplished by first removing the screws 52 and then swinging the cab upwardly and forwardly about the hinge rod 44 as a center, and in which open position the cab is held by the rod 36. Movement of the cab to open position is made possible because the instrument panel 21 and the seat 17 are mounted independently of the cab and in such spaced relation to the walls thereof that they do not interfere with movement of the cab.

Referring now to Figs. 9 and 10, I have here shown another form of my invention in which an engine hood H1 of the same three sided construction as the hood H, is hingedly mounted at its forward end by a hinged structure, generally indicated at S, which is similar to the hinged structure for the hood H. This hinged structure S also provides a hinged mounting for the extension 24b as in the first form of my invention.

The hood H1 is supported in elevated position by a conventional form of bracket B connected at its forward end to the hood and at its rear end to a frame G. This frame G is of U-form with its ends secured to the platform 16. The horizontal portion of this frame to which the rear end of the bracket B is connected, is of a width to span the space between the hood and a driver's cab C1.

The cab C1 is of the same construction as the cab C but it is not hingedly mounted at its forward end as is the latter. Instead, it is removably secured to the platform 16 by four bolts 60 which extend through gussets 61 secured in the corners of the cab.

As in the first form of my invention, the hood H1 can be lifted to open position to make the engine accessible for minor adjustments and repairs, but when a major overhaul of the engine is desired which requires that all sides of the engine be made accessible, the cab C1 can be completely removed from the truck by removing the bolts 60 to detach it from the platform 16. With the cab removed that side of the engine facing the cab is rendered accessible as well as the other sides of the engine when the hood is in elevated position. Removal of the cab is not interfered with by the instrument panel 21 or the seat 17, since as in the first form of my invention these elements are so spaced from the walls of the cab as to not interfere with removal of the cab from the platform.

Although I have herein shown and described only two means for mounting a driver's cab and an engine hood on a motor truck, it is to be understood that various changes and modifications may be made herein without departing from the spirit of my invention and the spirit and scope of the appended claims.

What I claim is:

1. In a motor truck: a frame; an engine at one end of the frame and substantially to one side of the longitudinal center thereof; a cab on the frame opposite the engine and substantially to the other side of the longitudinal center of the frame; a hood for the engine having an open side facing one side of said cab; and common means pivotally mounting the same end of the hood and the cab on said frame so that one or both can be raised to an engine exposing position.

2. In a motor truck: a frame; an engine at one end of the frame and substantially to one side of the longitudinal center thereof; a driver's cab on the frame opposite the engine; a hood for the engine and substantially to the other side of the longitudinal center of the frame having an open side facing one side of said cab; common means pivotally mounting the same end of the hood and the cab on said frame so that one or both can be raised to an engine exposing position; and independent means for supporting the cab and hood in a raised position.

3. In a motor truck: a frame; an engine at one end of the frame and substantially to one side of the longitudinal center thereof; a cab on the frame opposite the engine and substantially to the other side of the longitudinal center of the frame; a hood for the engine having an open side facing one side of the cab; means hingedly mounting the front end of the hood on the frame so that the hood can be raised upwardly and forwardly of the engine; means hingedly mounting the forward end of the cab on the frame so that it can be raised forwardly and upwardly on the frame; and means for supporting the hood and cab in raised position.

4. In a motor truck; a frame; an engine supported on the frame; a hood for the engine pivoted on the frame to occupy raised and lowered positions, and covering the top and three sides of the engine when in lowered position leaving an open side at the other side of the engine; a cab on the frame at the open side of the hood, and spanning the latter; and coacting means on the frame and the cab for detachably securing the cab to the frame.

5. In a motor truck: a frame; an engine at one end of the frame; a hood for the engine having an open side; a cab on the frame spanning the open side of the hood; an extension on the front end of the hood extending across the front end of the cab; a hinge structure pivotally connecting the front end of the hood and the extension to the frame for swinging movement longitudinally of the frame permitting the hood to be raised and lowered; and a second hinge structure having parts common to the first mentioned hinge structure for pivotally connecting the front end of the cab to the frame for swinging movement longitudinally of the frame permitting the cab to be raised to expose the open side of the hood.

6. In a motor truck: a frame; an engine supported on and extending longitudinally of the frame; a hood for the engine pivoted on the frame to occupy raised and lowered positions, and covering the top, the front and rear ends, and one side of the engine when in lowered position leaving an open side at the other side of the engine; a cab on the frame at the open side of the hood; and means for so supporting the cab on the frame that the cab can be moved to occupy one position in which it closes the open side of the hood, or to another position in which it opens the open side of the hood.

7. In a motor truck: a frame; an engine at one end of the frame; a hood for the engine having an open side; a cab on the frame spanning the open side of the hood; an extension on the front end of the hood extending across the front end of the cab; a hinge structure pivotally connecting the front end of the hood and the extension to the frame for swinging movement longitudinally of the frame permitting the hood to be raised and lowered; and a second hinge structure pivotally connecting the front end of the cab to the frame so that the cab can be swung to raised position after the hood is raised.

References Cited in the file of this patent

UNITED STATES PATENTS

| | | |
|---|---|---|
| 1,852,464 | Leipert | Apr. 5, 1932 |
| 2,143,983 | Howell | Jan. 17, 1939 |
| 2,210,519 | Wollensak | Aug. 6, 1940 |
| 2,502,622 | Harris | Apr. 4, 1950 |
| 2,529,200 | Swanson | Nov. 7, 1950 |
| 2,699,223 | Brumbaugh | Jan. 11, 1955 |
| 2,700,428 | Nallinger | Jan. 25, 1955 |

FOREIGN PATENTS

| | | |
|---|---|---|
| 460,465 | Great Britain | Jan. 26, 1937 |
| 585,235 | Great Britain | Feb. 3, 1947 |

OTHER REFERENCES

"Nairobi" Bus Adv. and "Italy Needs Transport," in "Transport World," March 14, 1946, pp. 236–237.